(12) United States Patent
Kostrzewsky et al.

(10) Patent No.: US 6,886,985 B1
(45) Date of Patent: May 3, 2005

(54) AUXILIARY FAN COOLING OF BEARING HOUSINGS

(75) Inventors: Gregory J. Kostrzewsky, Columbus, IN (US); Qimin J. Dong, Greer, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/677,075

(22) Filed: Sep. 29, 2000

(51) Int. Cl.[7] .............................................. F16C 37/00
(52) U.S. Cl. ...................................... 384/317; 384/900
(58) Field of Search ................................ 384/313, 317, 384/320, 467, 476, 900; 74/606 A; 184/6.22, 184/6.12; 165/47, 121, 287, 288

(56) References Cited

U.S. PATENT DOCUMENTS

| | | | | |
|---|---|---|---|---|
| 1,968,618 A | * | 7/1934 | Padgett et al. ................. 74/424 |
| 2,352,206 A | * | 6/1944 | Kendall ....................... 384/476 |
| 2,511,479 A | * | 6/1950 | Olah .......................... 74/606 A |
| 3,353,591 A | * | 11/1967 | Zak ........................... 74/606 A |
| 3,548,396 A | * | 12/1970 | Roberts ....................... 327/453 |
| 4,806,832 A | * | 2/1989 | Muller ........................ 318/471 |
| 4,872,502 A | * | 10/1989 | Holzman ...................... 74/606 A |
| 5,927,384 A | * | 7/1999 | Waldner, Jr. .................. 74/606 A |
| 6,425,293 B1 | * | 7/2002 | Woodroffe et al. ............. 73/756 |

* cited by examiner

*Primary Examiner*—William C Joyce
(74) *Attorney, Agent, or Firm*—Patrick S. Yoder; Alexander M. Gerasimow

(57) ABSTRACT

A temperature controlled bearing includes a bearing element disposed within a temperature conductive housing for receiving and facilitating the rotation of a shaft. An oil sump may be formed within the housing or bearing which contains a supply of lubricant for the bearing. At least one fan is mounted to the exterior of the bearing housing, such as adjacent an oil sump. The fan is adapted to transfer heat from the bearing housing to the atmosphere by forced convection. A temperature sensor may be disposed within the bearing housing and coupled to a logic controller. The logic controller operates the fan according the temperature of the bearing as detected by the sensor.

22 Claims, 4 Drawing Sheets

AUXILIARY FAN COOLING OF BEARING HOUSINGS

BACKGROUND OF THE INVENTION

1. Field of the Invention

The present invention relates generally to the field of bearings and the temperature control of such bearings. More particularly, the invention relates to a novel arrangement for simply and economically cooling a bearing and/or the lubricant of a bearing by enhancing the heat dissipation from the bearing housing.

2. Description of the Related Art

A wide variety of bearings are available and are currently in use throughout a range of industrial applications. Bearings are generally used for facilitation of rotational movement in a mechanical application. In general, a typical bearing includes a plurality of bearing elements situated in a housing. Depending upon the application and the anticipated loading, the bearing elements may be journal bearings, needle bearings, roller bearings, ball bearings, and so forth.

A journal bearing is formed from a plain cylindrical or profiled sleeve that carries a rotating shaft. Journal bearings are sometimes referred to as fluid film bearings because of the presence of a small film of lubricant formed between the cylindrical sleeve and the rotating shaft. The coefficient of friction experienced by the rotating shaft is dependent on whether a fluid film is fully developed. In essence, a fully developed fluid film creates a hydrodynamic pressure sufficient to float the shaft and its respective load relative to the sleeve or journal. The result of a fully developed fluid film is that there is no physical contact between the rotating shaft and the journal during operation. Proper development of a fluid film is dependent upon adequate lubrication of the bearing journal.

Another bearing type, antifriction bearings, rely on bearing elements disposed between inner and outer rings or races. In these bearings, too, lubrication is important to reduce the coefficient of friction between the component parts. The lubricant also aids in cooling the bearing elements and carrying away contaminants or small debris which may find their way into the bearing or which may be released from the component parts over time.

Adequate lubrication has other related and consequential benefits in addition to proper fluid film development. For example, it is commonplace to equip a bearing with a means for lubricating the bearing elements during operation to prolong the useful life of the bearings. This is typically accomplished by providing a synthetic or mineral grease or oil to coat the surfaces of the bearing elements. The application of grease or oil serves to preclude the ingress of contaminants, such as dirt, debris, moisture, and so forth into the bearing. In some applications the application of oil is accomplished by use of an oil ring. An oil ring hangs loosely over a shaft and rotates as the shaft rotates due to the ring's contact with the shaft. Lubricant is carried from an oil sump to the shaft, then to the bearing surface or liner. Another method is to use a circulating oil system wherein a pressurized lubricant is supplied directly to the bearing surface or liner. In other applications, a pressurized oil mist may be circulated through a bearing cavity to provide continuous lubrication of the bearing. Each lubrication method operates to prevent the ingress of contaminants, while flushing the bearing cavity of contaminants and moisture.

As noted above, another advantage provided by proper lubrication is the cooling of the bearing during operation. In certain fluid film bearings, an oil ring hangs loosely from the shaft into a lubricant bath. The bath is formed in a lower region of the bearing housing often referred to as the oil sump. The rotation of the shaft induces a rotation in the oil ring. The oil ring thus travels through the oil sump causing some of the lubricant to adhere. The lubricant then disperses onto the surface of the shaft and eventually drains back down into the oil sump below. Heat, generated between the shaft and the bearing or conducted by the shaft or bearing, is transferred to the lubricant, which drains to the oil sump and transfers the heat to the bath. Heat is typically removed from the bath in one of two ways. The heat may be transferred from the oil bath through the bearing housing by conduction, and then to the atmosphere by convection. This method of dissipating heat by convection may be limited by the design of the housing as well as the ambient temperature of the atmosphere relative to the temperature of the bearing housing. The alternative to convection is to use a circulating oil system. Such systems can, however, add significantly to the cost of the installation and to the maintenance required for its upkeep.

A circulating oil system is an effective means of removing heat from a bearing. A circulating oil system takes the lubricant from the oil sump and passes it through a heat exchanger. The lubricant in the oil sump is thus repetitively or continuously removed and replenished with cooled lubricant. Circulating oil systems also may employ other features such as filtration. Filtration keeps the lubricant in a useable condition for a longer period of time. Filtration also helps to keep contaminants from being introduced, or re-introduced, to the bearing elements. However, as previously noted, oil circulation systems are often expensive and can require additional maintenance.

A number of advantages are offered by effective control of the temperature of bearings. The principle advantage is that the shaft and/or bearing elements may become damaged by operation at elevated temperatures. Likewise, lubrication is adversely affected by elevated temperatures. Lubricants are chosen according to certain criteria, one of them being an anticipated or calculated operating temperature range. If the lubricant is exposed to temperatures outside of the specified range, the effectiveness of the lubricant may be greatly diminished. If, for example, a lubricant exceeds the recommended upper temperature limit, the viscosity of the lubricant may be reduced, the lubricant itself may be degraded, and the bearing elements and shaft may experience a greater amount of friction, and ultimately even more heat will be generated. Thus, operating temperature is an important factor in the proper operation of a bearing.

There is a need, therefore, for an improved technique for efficiently and effectively removing heat from a bearing. There is also a need for a cooling system for bearings that can be installed on new bearings as well as easily retrofitted on existing bearings.

SUMMARY OF THE INVENTION

The invention provides a novel technique to bearing temperature control designed to address these needs. In accordance with one aspect of the present invention, a temperature controlled bearing is provided. The bearing includes a thermally conductive housing, a bearing element disposed within the housing for receiving and facilitating the rotation of a shaft, and, where desired, an oil sump formed within the housing which contains a bath of lubricant for the bearing. At least one fan is mounted to the exterior of the bearing housing adjacent the oil sump or at any other desired location around the housing. The fan is adapted to transfer heat from the bearing housing to the atmosphere by forced convection.

A temperature sensor may be disposed within the bearing housing and coupled to a logic controller. The logic controller can then operate the fan according to the temperature of the bearing as detected by the sensor. Multiple fans may be mounted to the bearing housing and the logic controller can then control all fans, switching the fans on and off separately or in cooperation, or in stages depending upon the temperature sensed. Alternatively, the logic controller can determine speeds at which the fan or fans should operate according to the temperature detected by the sensor.

In accordance with another aspect of the invention, a method is provided for controlling the temperature of a bearing which has a thermally conductive housing. The method includes mounting at least one fan on the bearing housing, disposing a temperature sensor within the bearing housing, and electrically coupling a logic controller between the fan and the temperature sensor. The logic controller is adapted to receive a signal from the temperature sensor and to operate the fan in response to the signal received. The logic controller may be programmed in various ways to accomplish the cooling requirements of a specific application.

In accordance with yet another aspect of the invention, a system is provided for cooling a plurality of bearings. Each bearing includes a thermally conductive housing with a temperature sensor disposed within the housing. At least one fan is affixed to each housing of each bearing. The fan is adapted to transfer heat away from the housing and to the atmosphere by means of forced convection. A logic controller is connected to each of the temperature sensors and to each of the fans. The logic controller is adapted to receive a signal from each temperature sensor and to subsequently operate the corresponding fan according to the detected temperature of the bearing.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
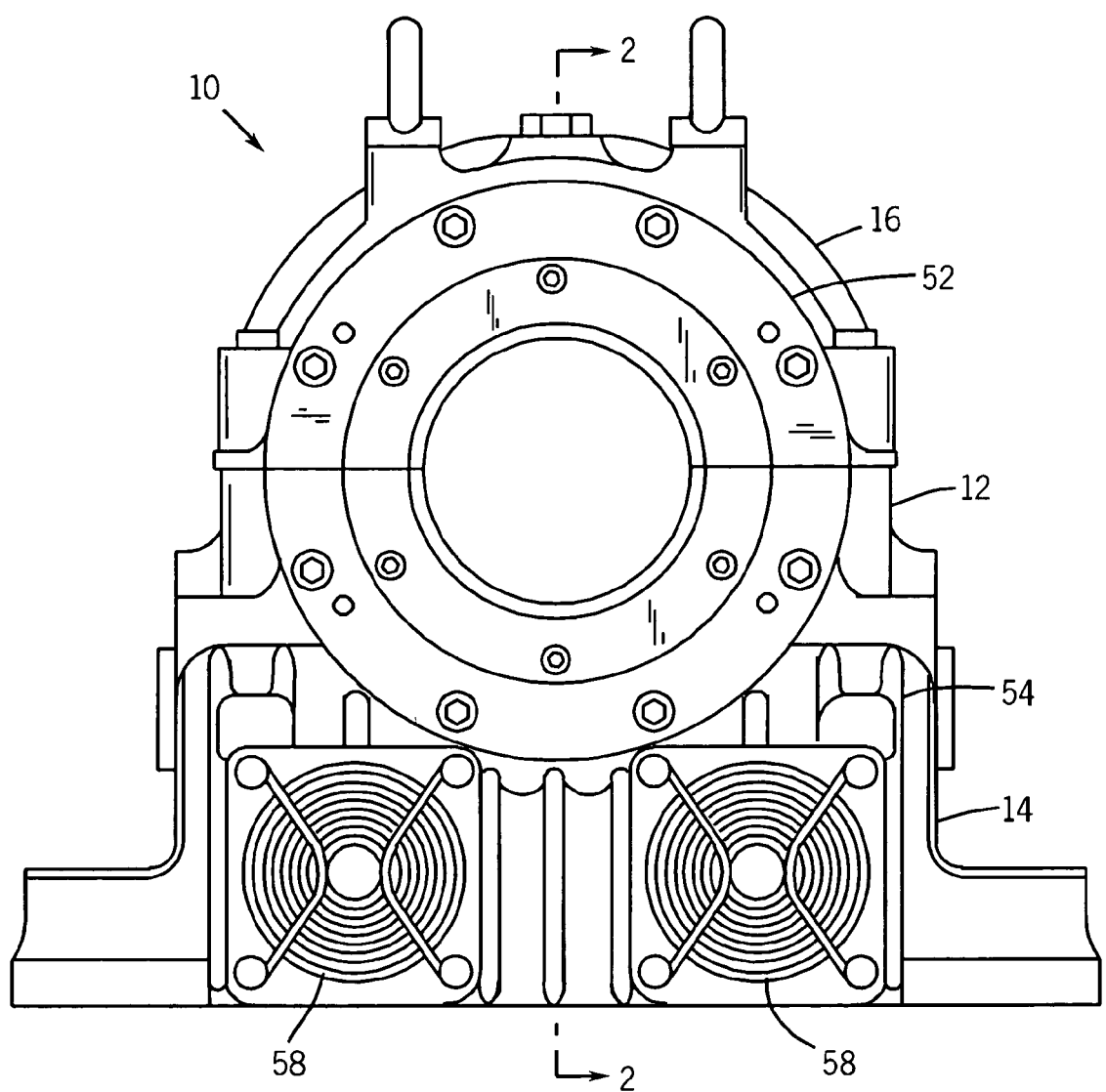
FIG. 1 illustrates a front elevational view of a bearing and fan assembly according to one embodiment of the invention.
Figure 2:
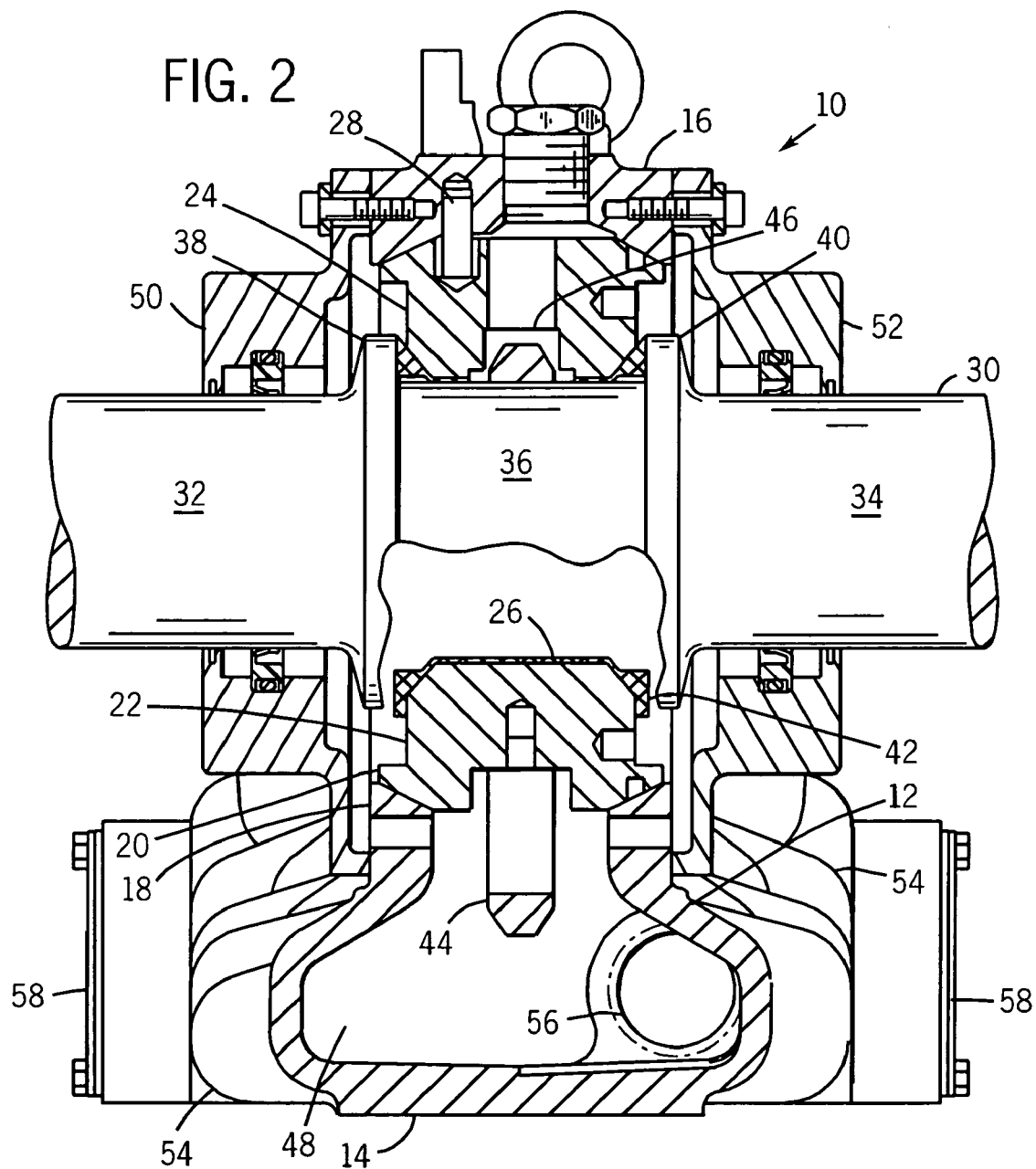
FIG. 2 illustrates a partial sectional view of the embodiment shown in FIG. 1.

Turning now to the drawings and referring to FIGS. 1 and 2, a bearing assembly 10 is shown. The bearing assembly 10 includes a bearing housing 12 which is formed from a base 14 and a cap 16. The cap 16 is coupled to the base 14 to house various internal components. In the illustrated embodiment, the housing 12 also includes a spherical seat support 18 (see FIG. 2) adapted for receiving a bearing element 20. In a present embodiment, the bearing element is formed of a lower bearing liner 22 and an upper bearing liner 24 which are mating and cooperating components. The inner surface of the bearing liners 22 and 24 are coated with a babbitt lining 26 in a manner well known to those skilled in the art. The bearing element 20 is fixed relative to the housing 12 with an anti-rotation pin 28.

The bearing assembly 10 is depicted as a fluid film bearing, but is contemplated as being a bearing of any type for facilitating motion of a rotating shaft or other machine element. Also, while a particular style of housing is depicted, numerous bearing housings are within the scope of this disclosure. For example, typical housings may conform to ISO standards 11687-1, 11687-2, or 11687-3. These and any other suitable housings may be incorporated in alternative embodiments.

A shaft 30 is received by the bearing element 20 and traverses the bearing housing 12. In the illustrated embodiment the shaft 30 is defined as having an inboard side 32, an outboard side 34 and center portion known as the journal 36. Flanking the bearing journal 36 are a pair of thrust collars defined as the inboard thrust collar 38 and the outboard thrust collar 40. Each collar abuts a babbitt lined thrust shoulder 42 located on the bearing element. The thrust collars 38 and 40 work in conjunction with the thrust shoulder 42 to restrict the transverse or lateral movement of the shaft 30 within the bearing. It should be noted that not all bearings are capable of resisting thrust and that non-thrust bearings are contemplated as being suitable for use in alternative embodiments.

An oil ring 44 loosely surrounds the journal 36 and is shown to be hanging from the top side of the shaft 30 adjacent a small void 46 in the inner surface of the upper bearing liner 24. The oil ring 44 also encircles the lower bearing liner 22 and the lower portion of the oil ring is exposed to an oil sump 48 located beneath the shaft 30 and bearing element 20. The oil ring 44 maintains loose contact with the shaft 30 and rotational motion of the shaft induces motion of the oil ring 44. As the oil ring 44 rotates, it travels through the oil sump 48 which contains a bath of oil or other lubricant. A small portion of the lubricant from the oil sump 48 adheres to the oil ring 44 and travels with the oil ring until it contacts the top portion of the shaft 30. The lubricant then spreads on the bearing journal 36 and works its way between the bearing journal 36 and the babbitt lining 26. The lubricant forms a thin film between the bearing journal 36 and the babbitt lining 26. With a properly formed fluid film, the shaft 30 rotates without actually contacting the babbitt lining 26 on the bearing element 20. A set of seal assemblies 50 and 52 are mounted to the bearing housing 12 to contain the lubricant within the housing as well as to keep various contaminants from entering into the housing. The seal assemblies 50 and 52 are shown to be similar in construction to one another, however, they may differ from each other in design and construction depending on the operating environment of the bearing as well as with other operating parameters.

Besides providing proper lubrication, the oil ring 44 and oil sump 48 of the lubrication system also serve to transfer heat away from the shaft 30 and bearing element 20. The lubricant acts as a heat transfer agent to absorb heat from the bearing element 20 and shaft 30, and to transfer it to the oil sump 48. Heat is subsequently transferred from the oil sump 48 to the bearing housing 12, and finally from the bearing housing 12 to the surrounding atmosphere. Cooling fins 54, integrated into the bearing housing 12, are employed to aid in the transfer of heat from the bearing housing 12 to the atmosphere. Cooling fins 54 offer increased surface area for convective heat transfer to the atmosphere, thus allowing heat to be transferred more effectively. The bearing will also typically include a temperature sensor (not shown in FIG. 2) disposed within the bearing housing 12. A port 56 is shown as a possible location for the temperature sensor in the area of the oil sump 48. Another desired location is in the bearing element 20 adjacent the babbitt lining 26. The temperature sensor is utilized for determining the operating temperature of the bearing and to indicate when cooling of the bearing is desirable.

Fans 58 are mounted on the exterior of the bearing housing 12 adjacent the cooling fins 54 and generally in the area of the oil sump 48. While cooling fins 54 are employed in the instant embodiment and are considered to be a desirable feature, they may be eliminated if sufficient heat transfer is available otherwise. A smooth-bodied housing may also be utilized. The fans 58 are placed to force a flow of air over the housing 12 to induce cooling by forced convection. Thus, the transfer of heat from the housing 12 to the surrounding atmosphere will be accomplished more quickly allowing the housing to absorb more heat from the oil or lubricant. Similarly, the lubricant will be able to transfer heat away from the shaft 30 and bearing element more efficiently, allowing the bearing 10 to operate safely within the desired temperature range.

It is noted that FIGS. 1 and 2 indicate multiple fans 58 mounted on the bearing housing 12. The number of fans to be utilized is a parameter to be determined according to the specific requirements of a given operation. However, numerous arrangements are contemplated as being within the scope of the invention.

Figure 3:
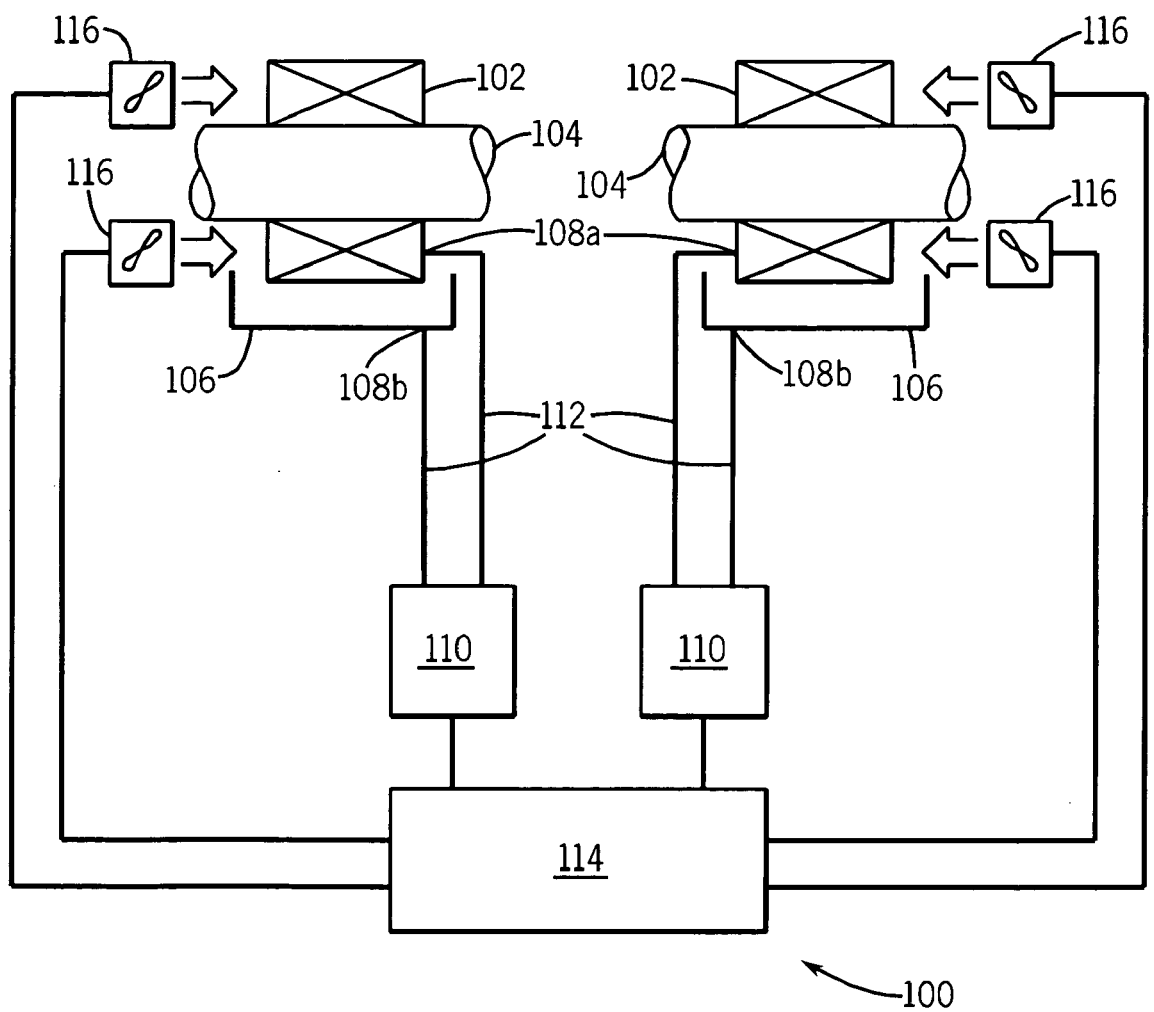
FIG. 3 is a schematic diagram of a system incorporating an embodiment of the invention.

Referring now to FIG. 3, a system 100 is described which incorporates the embodiment described above. A pair of bearings 102 are shown to be supporting a shaft 104. While only two bearings are depicted, the instant embodiment lends itself to simultaneous use with multiple bearings. An oil sump 106 is formed within each bearing 102 for facilitating proper lubrication of the bearings. Temperature sensors 108a are placed adjacent the bearing and/or adjacent the oil sump, as indicated by reference numeral 108b, for determining the operating temperature of the bearing. The temperature sensors 108 are connected to an interface 110 by means of a data bus 112. Each interface 110 is then connected to a controller 114 through similar means. The interface 110 relays a signal to the controller 114 which corresponds to the temperatures read by the sensors 108.

In operation, the controller 114 then uses the signal to compare the temperature of the bearing to a pre-selected range of temperatures. If the signal indicates that the temperature of the bearing 102 exceeds a desired limit, then the controller will turn on the fans 116 adjacent the bearing 102. The fans 116 transfer heat away from the bearing 102 and thus lower the operating temperature of the bearing. The sensors 108 continue to detect the temperature of the bearing 102 and, when a signal is received by the controller which indicates an operating temperature below a preset limit, the controller turns the fans 116 off and waits for new signals to be transmitted. The interface 110 and the controller 114 form a logic controller for operation of the fans 116 according to a pre-selected temperature range and the actual operating temperature of the bearing 102.

Numerous variations of the above system are contemplated. For example, the fans 116 could be variable speed. Instead of a simple on/off instruction supplied by the controller 114, the speed of the fans 108 could be continuously controlled according the temperature of the bearing as determined by the sensors 108 and relayed by the interface 110. Another alternative would be to operate multiple fans in stages. In such a scenario, a first temperature limit would be selected to cause the first fan to turn on. Subsequent (higher) temperature limits would then be selected to turn on secondary fans. Likewise, a limit or set of limits could then be selected for turning the fans off either all at once or again in stages. Of course a combination of the two approaches may also be envisaged. In combining the two approaches, for example, the controller 114 might instruct a primary fan to simply turn on and off, while secondary fans could be instructed to operate at variable speeds.

Figure 4:
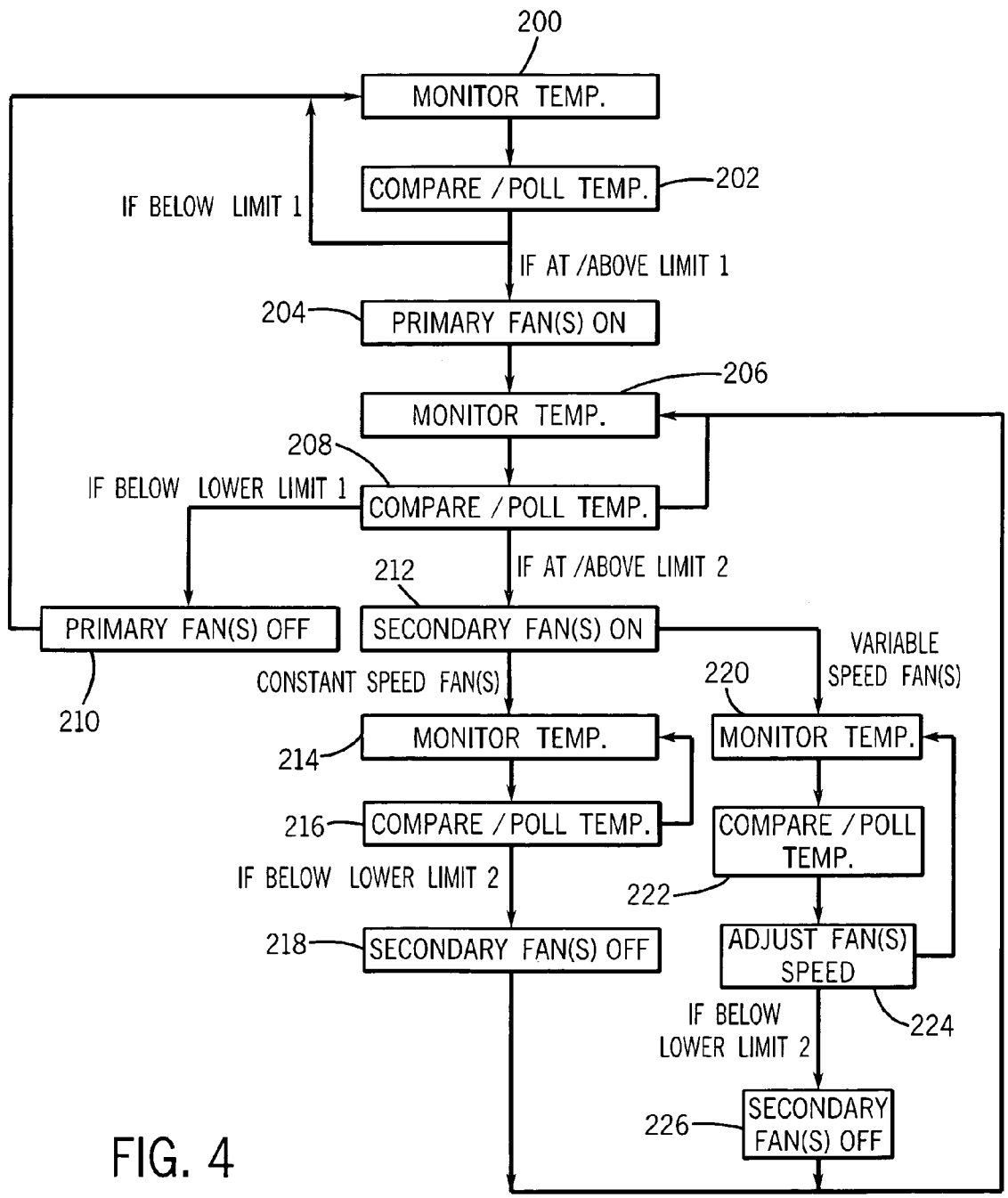
FIG. 4 is a flow chart depicting exemplary logic utilized in one embodiment of the invention.

As an example, FIG. 4 is a flow chart summarizing exemplary logic that might be employed in the temperature control described above. In a first step 200 the temperature of the bearing is monitored. Based upon the monitored temperature, the actual bearing temperature is compared to a desired range or to a first pre-selected upper limit as indicated at step 202. If the bearing temperature is below the first upper limit then the monitoring step 200 is repeated. If the bearing temperature is at or above the first upper limit then the primary fan or fans are activated at step 204. With the primary fan on, the temperature is again monitored at step 206, and compared to pre-selected values at step 208. Again, if the bearing temperature is within a specified range, the monitoring step 206 is repeated followed by the comparing step 208. This continues until the temperature is out of the specified range. If the bearing temperature falls below a first pre-selected lower limit then the primary fan is turned off as indicated at step 210, and the process is reinitiated at step 200. If the bearing temperature is above a second pre-selected upper limit, then secondary fan or fans are activated at step 212.

At this point, two different scenarios may be envisaged. First, an embodiment is contemplated wherein constant speed fans are utilized for cooling the bearings. In a second embodiment, variable speed fans are utilized. Each will be discussed separately for sake of clarity and convenience.

If constant speed fans are utilized, the bearing temperature is again monitored at step 214 and compared to a range of desired temperatures at step 216. If the bearing temperature is within the specified range, the monitoring and comparing steps 214 and 216 will be repeated. If the bearing temperature is below a second pre-selected lower limit, the secondary fan is turned off at step 218, and the monitoring process begins again at step 206.

If variable speed fans are used, the process continues with the monitoring at step 220 and comparison at step 222 of the sensed temperature and a desired temperature range or limit. The fan speed is then adjusted accordingly as summarized at step 224. For example, as the bearing temperature rises, the fan speed will also be increased. Likewise, the fan speed will be decreased with a drop in bearing temperature. It is noted that the correspondence between temperature change and change in fan speed need not be linear. When the bearing temperature falls below the second lower limit, the secondary fan will be turned off at step 226 and the logic will revert back to step 206.

The logic described above and disclosed in FIG. 4 is intended to be illustrative only, and should not be construed as being limiting in any sense. For example, the secondary fans could be a combination of both variable speed fans and constant speed fans. Also, the logic shown implies that constant speed fans are used for the primary fans. Variable speed fans may be utilized here as well. Multiple stages may be used, beyond the two shown in FIG. 4, depending on the specific requirements of an application. Thus, for example, four fans may be mounted on a bearing housing, as shown in FIGS. 1 and 2, each fan with its own stage and logic sequence, or with simple on/off control switches. It should also be noted that the various temperature levels at which the fans might be switched off or on may be selected to provide hysteresis in the operation of the fans, and to avoid "hunting" or repeated switching off and on, such as by selection of two, three or four distinct temperature switching levels.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A bearing comprising:
a temperature conducting housing;
a bearing element disposed within the housing;
an oil sump to house lubricant for the bearing element;
a plurality of motor driven electric fans mounted to the bearing housing, wherein the plurality of motor driven electric fans are adapted to transfer heat from the bearing housing by forced convection;
a temperature sensor disposed within the bearing housing adjacent to the bearing element and adapted for determining a temperature within the bearing housing; and
a logic controller coupled to the temperature sensor and operable to selectively operate each of the plurality of motor driven electric fans based on the temperature within the bearing housing.

2. The bearing of claim 1, wherein the bearing housing includes an oil sump, and wherein at least one of the plurality of motor driven electric fans is disposed adjacent to the oil sump.

3. The bearing of claim 1, wherein the bearing housing includes a plurality of cooling fins.

4. The bearing of claim 1, wherein the temperature sensor is adapted for determining the temperature of the bearing element.

5. The bearing of claim 1, wherein the temperature sensor is adapted for determining the temperature of an oil sump within the bearing housing.

6. The bearing of claim 1, wherein the logic controller is adapted to receive a signal from the temperature sensor, process the signal, and selectively operate each of the plurality of motor driven electric fans according to the received signal.

7. The bearing of claim 6, wherein the signal from the temperature sensor is generated according to the temperature within the housing.

8. The bearing of claim 7, wherein an upper temperature limit is pre-selected and wherein the logic controller is adapted to turn at least one motor driven electric fan on based upon a relationship between a sensed temperature and the upper temperature limit.

9. The bearing of claim 8, wherein a lower temperature limit is pre-selected and wherein the logic controller is adapted to turn the at least one motor driven electric fan off based upon a relationship between a sensed temperature and the lower temperature limit.

10. The bearing of claim 1, wherein the plurality of motor driven electric fans comprises at least one primary fan and at least one secondary fan.

11. The bearing of claim 10, wherein a first temperature limit is pre-selected and wherein the logic controller is adapted to turn the at least one primary fan on based upon a relationship between a sensed temperature and the first temperature limit.

12. The bearing of claim 11, wherein a second temperature limit is pre-selected and wherein the logic controller is adapted to turn the at least one secondary fan on based upon a relationship between a sensed temperature and the second temperature limit.

13. The bearing of claim 12, wherein a third temperature limit is pre-selected and wherein the logic controller is adapted to turn the at least one secondary fan off based upon a relationship between a sensed temperature and the third temperature limit.

14. The bearing of claim 13, wherein a fourth temperature limit is pre-selected and wherein the logic controller is adapted to turn the at least one primary fan off based upon a relationship between a sensed temperature and the fourth temperature limit.

15. The bearing of claim 1, wherein each of the plurality of motor driven electric fans are adapted to operate at variable speeds and wherein the logic controller is adapted to control the speed of each of the plurality of motor driven electric fans.

16. A method for controlling the temperature of a bearing having a housing and a bearing element disposed within the housing, the method comprising:
mounting a plurality of fans on the bearing housing to remove heat from bearing element lubricant disposed within the bearing housing;
disposing a temperature sensor within the bearing housing adjacent to the bearing element;
electrically coupling a logic controller between the plurality of fans and the temperature sensor; and
adapting the logic controller to receive a signal from the temperature sensor and to operate at least one of the plurality of fans at various speeds in response to the signal received.

17. The method of claim 16, wherein the housing includes an oil sump and disposing a temperature sensor comprises disposing the temperature sensor adjacent to the bearing element and within the oil sump.

18. The method of claim 16, comprising pre-selecting a temperature range in which the plurality of fans will operate.

19. The method of claim 16, wherein mounting the plurality of fans comprises mounting at least one primary fan and at least one secondary fan.

20. The method of claim 19, comprising pre-selecting at least first and second temperature limits and adapting the logic controller to operate at least one primary fan in response to a signal received which corresponds to the first temperature limit and to operate at least one secondary fan in response to a signal received which corresponds to the second temperature limit.

21. A system comprising:
a plurality of bearings, each bearing including a thermally conductive housing and a bearing element disposed within the housing;
a plurality of fans affixed to the housing of each bearing;
a temperature sensor disposed within the housing of each bearing adjacent to the bearing element and corresponding to the fans affixed on the same bearing; and
a logic controller adapted to receive a signal from each temperature sensor and to operate at least one of the corresponding fans at various speeds according to the received signal.

22. The system of claim 21, further comprising an oil sump formed in each bearing housing, and wherein at least one of the fans is disposed adjacent to each oil sump.

* * * * *